Oct. 22, 1929.     C. H. LANDON     1,732,273
BEARING BUSHING
Filed Sept. 17, 1924     2 Sheets-Sheet 1
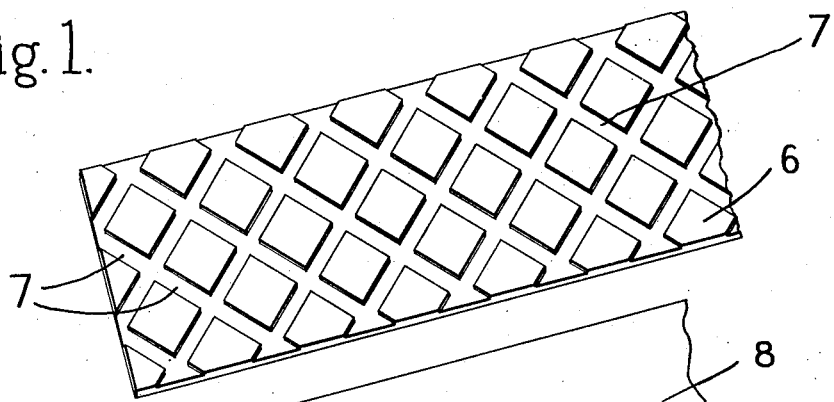
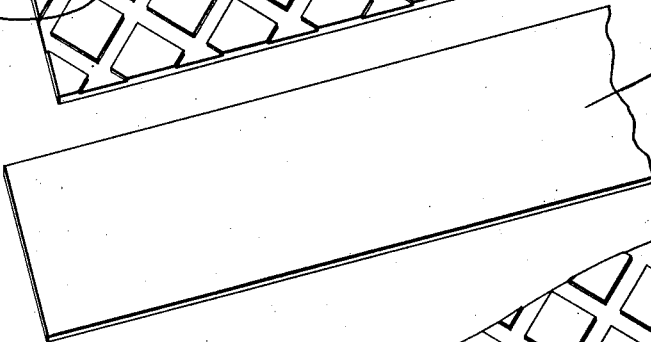
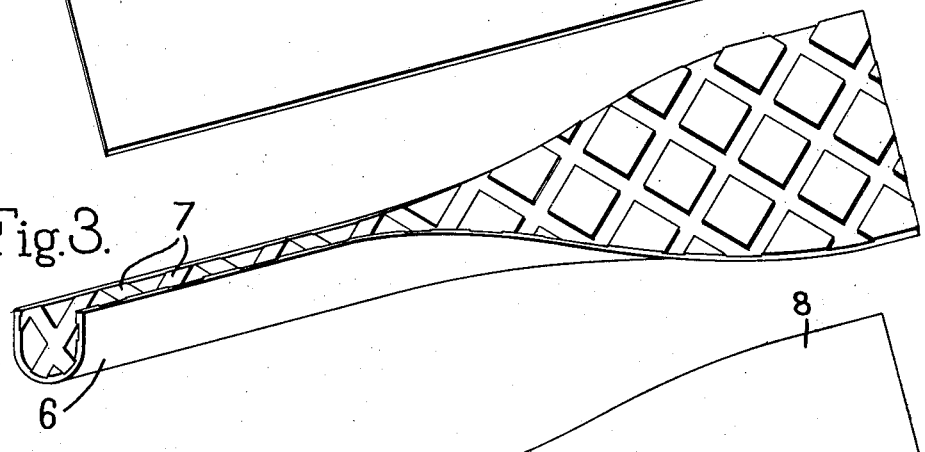
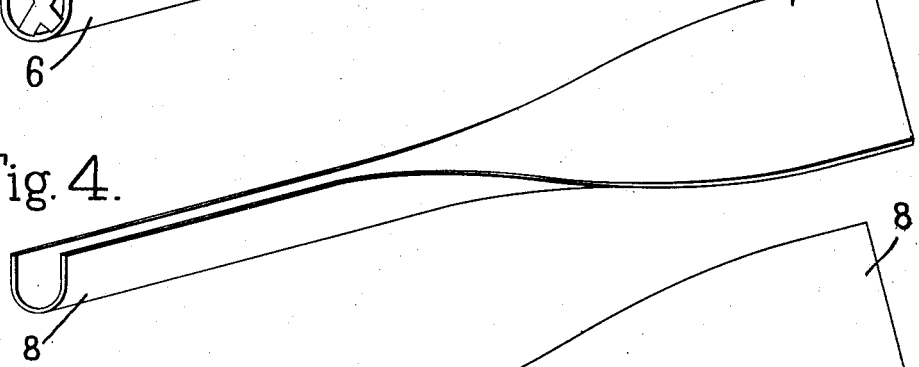
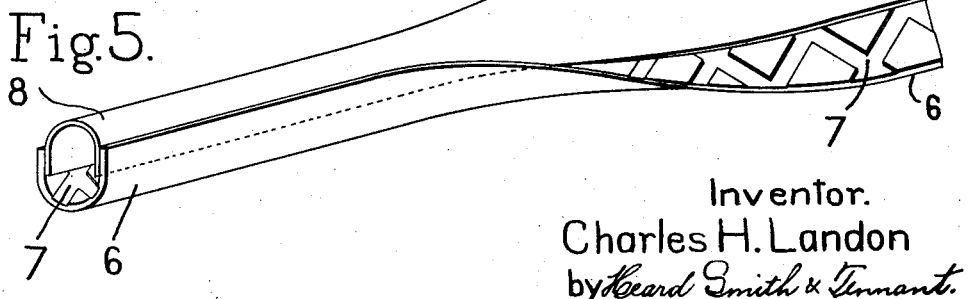
Inventor.
Charles H. Landon
by Heard Smith & Tennant.
Attys.

Oct. 22, 1929.  C. H. LANDON  1,732,273
BEARING BUSHING
Filed Sept. 17, 1924   2 Sheets-Sheet 2
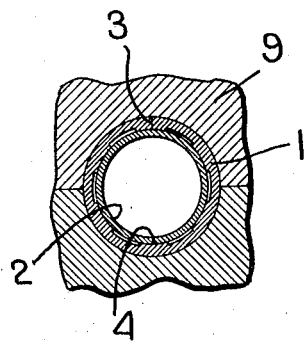
Fig.6.
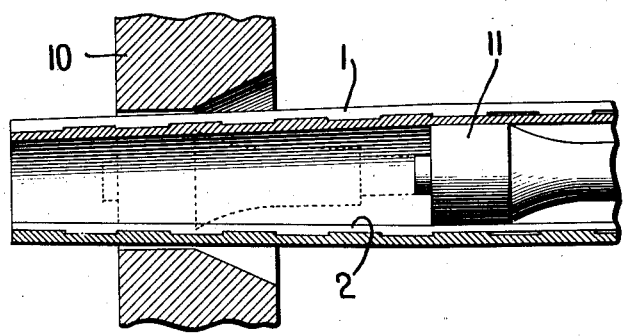
Fig.7.
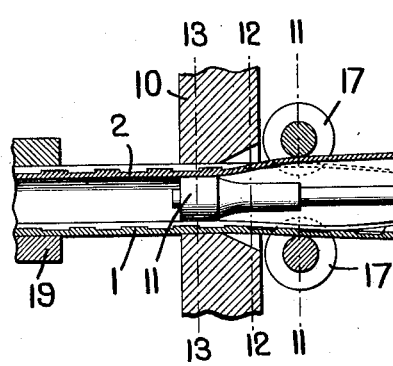
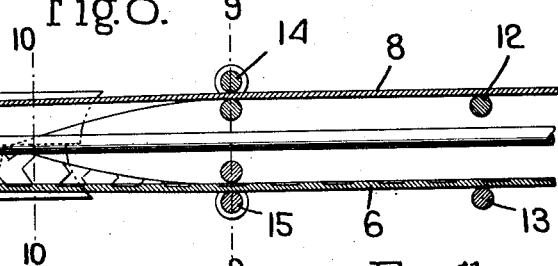
Fig.8.
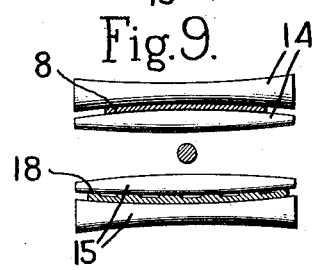
Fig.9.
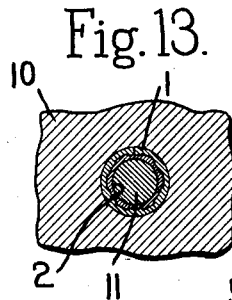
Fig.10.
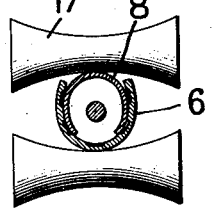
Fig.11.
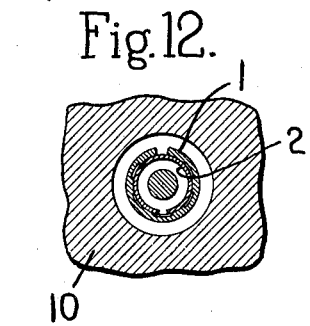
Fig.12.  Fig.13.
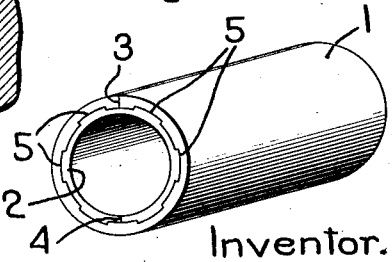
Fig.14.
Inventor.
Charles H. Landon
by Heard Smith & Tennant.
Attys.

Patented Oct. 22, 1929

1,732,273

UNITED STATES PATENT OFFICE

CHARLES H. LANDON, OF DALLAS, TEXAS, ASSIGNOR TO THE CLEVELAND GRAPHITE BRONZE COMPANY, OF CLEVELAND, OHIO, A CORPORATION OF OHIO

BEARING BUSHING

Application filed September 17, 1924. Serial No. 738,159.

This invention relates to lined bearing bushings and the process of making the same.

Lined bearing bushings have heretofore been made by various processes. One of these processes consists in forming a butt-joint tubular lining, inserting this into a seamless tube which constitutes the exterior shell and then subjecting the assembled tubes to pressure internally and externally to size them both internally and externally and to fix the tubes together.

Another process by which lined bearing bushings have been made consists in placing in juxtaposition a blank strip of lining metal and a blank of harder metal and then simultaneously bending these blanks into tubular shape which makes a composite tube in which the butt joints of the lining and the exterior shell are in alignment with each other.

In making these composite tubes for bearing bushings it has also been proposed to make the inner surface of the exterior shell with grooves or ribs so that when the assembled bushings are subjected to pressure both externally and internally, as would result if the tube were drawn through a die and over a plug, the material of the softer lining member would be forced into the depressions or around the projections on the shell member thereby interlocking the two tubular members together. The use of the seamless tubes for the exterior shell has the advantage that it prevents the lining member from separating at the butt joint but the use of a seamless exterior tube adds to the expense incident to manufacture.

A composite tube in which both the lining member and exterior member or shell are butt-joint tubes with the joints of the two tubes in alignment is open to the objection that the composite tube is apt to separate at the aligned butt joints.

It is one of the objects of my invention to provide a composite tube in which both the lining member and the exterior shell are in the form of a butt-joint tube but in which the butt joints of the two members are non-aligned. The use of butt-joint tubes for both inner and outer members has the advantage that it cheapens the manufacture over the use of a seamless tube for one of the members and it has the further advantage that where the butt joints are non-aligned they will not open, especially when the inner surface of the exterior tube is formed with depressions into which the material of the lining member is forced by some suitable process.

In order to give an understanding of the invention I have illustrated in the drawings a selected embodiment thereof and one way in which the process may be carried out.

In the drawings:

Fig. 1 is a perspective view of a strip of metal from which the exterior shell is made;

Fig. 2 shows a strip of metal from which the lining member is formed;

Figs. 3, 4, 5 and 6 illustrate different steps in the process of forming the two strips into tubular shape and assembling them;

Fig. 7 shows the manner of introducing the assembled tubes into the die;

Fig. 8 is a sectional view showing the process of progressively forming the two strips of metal into tubular form and simultaneously assembling the tubes one within the other and reducing the composite tube to the desired size both externally and internally;

Fig. 9 is a section on the line 9—9, Fig. 8;

Fig. 10 is a section on the line 10—10, Fig. 8;

Fig. 11 is a section on the line 11—11, Fig. 8;

Fig. 12 is a section on the line 12—12, Fig. 8;

Fig. 13 is a section on the line 13—13, Fig. 8;

Fig. 14 is a perspective view of a bearing bushing made in accordance with my invention.

Referring first to the bearing bushing shown in Fig. 14 this comprises an outer member 1 of relatively hard metal and an inner lining member 2 of softer lining metal. The outer member 1 is in the form of a butt-joint tube, the butt joint of which is indicated at 3 and the inner lining member 2 is also in the form of a butt-joint tube, the butt joint of which is indicated at 4. These tubes are assembled so that the butt joints 3 and 4 are non-aligned, they being situated substantially diametrically opposite each other in Fig. 14.

The inner surface of the exterior or shell member 1 is formed with a plurality of depressions 5 into which the material of the lining member 2 has been forced by pressure thereby interlocking the lining member and the shell.

Since the lining member and shell are assembled with their butt joints in non-alignment and since they are interlocked as above described there will be no tendency for either to open at the joint. In fact by virtue of the interlocking each member serves to hold the other member from separating at the joint and as a result a lined bearing bushing is provided which will retain its dimensions as accurately as if the outer member were made of a seamless tube. The butt-joint construction, however, is less expensive to manufacture than the seamless tube type and my invention has all the advantages of the seamless tube form and the further advantage that it is less expensive to manufacture.

There are various ways in which this form of bearing bushing may be made. One way is to bend a strip or blank of relatively hard metal into semi-circular or trough shape, bend a blank of softer lining metal into a similar shape and then assemble the two semi-circular or trough-shaped members in a lateral direction and with the open side of the lining member entering the open side of the shell member and then subjecting the two members to a compressing or drawing operation to form them into tubular shape with the shell tube encircling the lining tube. This process can be carried out with blanks of the size to form a single bearing bushing or may be carried out with long strips which would form a long composite tube that can afterwards be cut into lengths for the individual bushings. The latter arrangement is that which is shown in the drawings.

In Fig. 1, 6 indicates in perspective view a portion of a strip of metal such as would be used in forming the exterior shell, said strip having on one face grooves or depressions 7.

8 in Fig. 2 indicates a strip of metal of the proper character for forming the lining of the composite bushing. In making the bushing the strip of metal 6 is bent longitudinally into the U shape shown in Fig. 3 with the surface having the depressions 7 therein on the inner side. The strip 8 is also bent longitudinally into U shape and is given such a dimension transversely that it will fit within the member 6. The two members are then assembled as shown in Fig. 5 by inserting the U-shaped lining member 8 into the open side of the U-shaped member 6 but with the open side of the member 8 opposed to the open side of the member 6.

After the two members are assembled as shown in Fig. 5 they are then subjected to the action of a suitable die or other mechanism which forms both the members 6 and 8 into cylindrical shape thus forming a composite tube in which both the outer and inner members have butt joints with the joints out of alignment with each other.

Where the process is carried out by using long strips of lining material and shell material I propose to bend one end of each strip into the U shape as shown in Figs. 3 and 4 and then to assemble the U-shaped ends of the strips as shown in Fig. 5, the remaining portion of said strips retaining their flat shape. The two assembled U-shaped ends of the strips 6 and 8 are then subjected to the action of a two-part die 9 as shown in Fig. 6 which forms it into the tubular shape shown, the member 6 encircling the lining member 8 and the butt joint 3 of the exterior member 6 lying opposite to the butt joint 4 of the lining member 8. The assembled tubular ends of the two strips are then inserted through a forming die 10 and are drawn over a plug 11 thereby subjecting the assembled tubes to pressure both internally and externally which results not only in sizing the finished product both externally and internally but also locks the two members together by forcing the material of the lining into the depressions 7 of the shell.

I propose to provide suitable forming rolls which are associated with this forming die so that as the tubular ends of the strips are drawn through the plug the strips will be progressively formed into tubular shape as they pass through the die so that by simply forming one end of each of the long strips into the tubular shape and assembling them as shown in Fig. 5 and then drawing the strip through the die the two strips will be bent into the tubular shape and assembled progressively to form a long composite tube.

An apparatus for accomplishing this is shown in Fig. 8 and it comprises two supporting rolls 12 and 13 on which the two strips 6 and 8 are supported, a set of forming rolls 14 through which the strip 6 passes as shown in Fig. 9 and which gives the strip an initial curvature, a similar pair of forming rolls 15 through which the other strip 8 is drawn and which partially forms said strip, a pair of side forming rolls 16 which acts on the edges of the two partially bent strips 6 and 8 as shown in Fig. 10 and serves to further bend them in opposite directions and another pair of rolls 17 situated closely adjacent the die and which acts on the strips 6 and 8 when they are being assembled and tends to force them into their proper relation to each other.

The strip may be drawn through the die 10 by means of jaws 19 of any suitable construction. In order to introduce the ends of the strips into the die 10 after said ends have been reduced to the tubular form and assembled I propose to make said ends of a diameter slightly smaller than the die 10 so that the ends of the tube can be inserted through the die 10 as shown in Fig. 7. While this operation is being performed the plug 11 is withdrawn as shown in full lines Fig. 7.

After the reduced ends have thus been inserted into the die 10 then the end of the formed composite tube is grasped by the jaws 19 and the tube is drawn through the die during which operation the plug 11 will be carried into its operative position shown in dotted lines Fig. 7 and in full lines Fig. 8 where it will be held by the plug rod 20.

After the tube has once started then continued drawing of the tube through the die will operate to progressively form each strip 6 and 8 into tubular shape and simultaneously assemble the tubes with the lining tube on interior of the shell tube. The operation of the plug and die serves also to force the material of the lining member into the depressions 7 in the inner wall of the shell member thereby interlocking the two members so that when the composite tube emerges from the die it will be in the form shown in Fig. 14. The finished tube may then be cut into any desired length for use as lined bearing bushings.

I claim:

1. A lined bearing bushing comprising an exterior butt-joint tubular shell having depressions on its inner face and a butt-joint tubular lining member situated within the shell, the exterior surface of the lining member having integral projections fitting into and completely filling the depressions in the shell and the butt joints of the lining member and shell being non-aligned.

2. A lined bearing bushing comprising an exterior butt joint tubular shell having depressions on its inner face, and a butt joint tubular lining member situated within the shell, the exterior surface of the lining member having integral projections fitting into and substantially filling the depressions in the shell, and the butt joints of the lining member and shell being non-aligned.

In testimony whereof, I have signed my name to this specification.

CHARLES H. LANDON.